Nov. 14, 1961 M. M. FRIMODIG 3,008,974
METHOD FOR THE SEPARATION OF METALLIC IONS BY
THE USE OF AN ION EXCHANGE RESIN
Filed Oct. 5, 1956
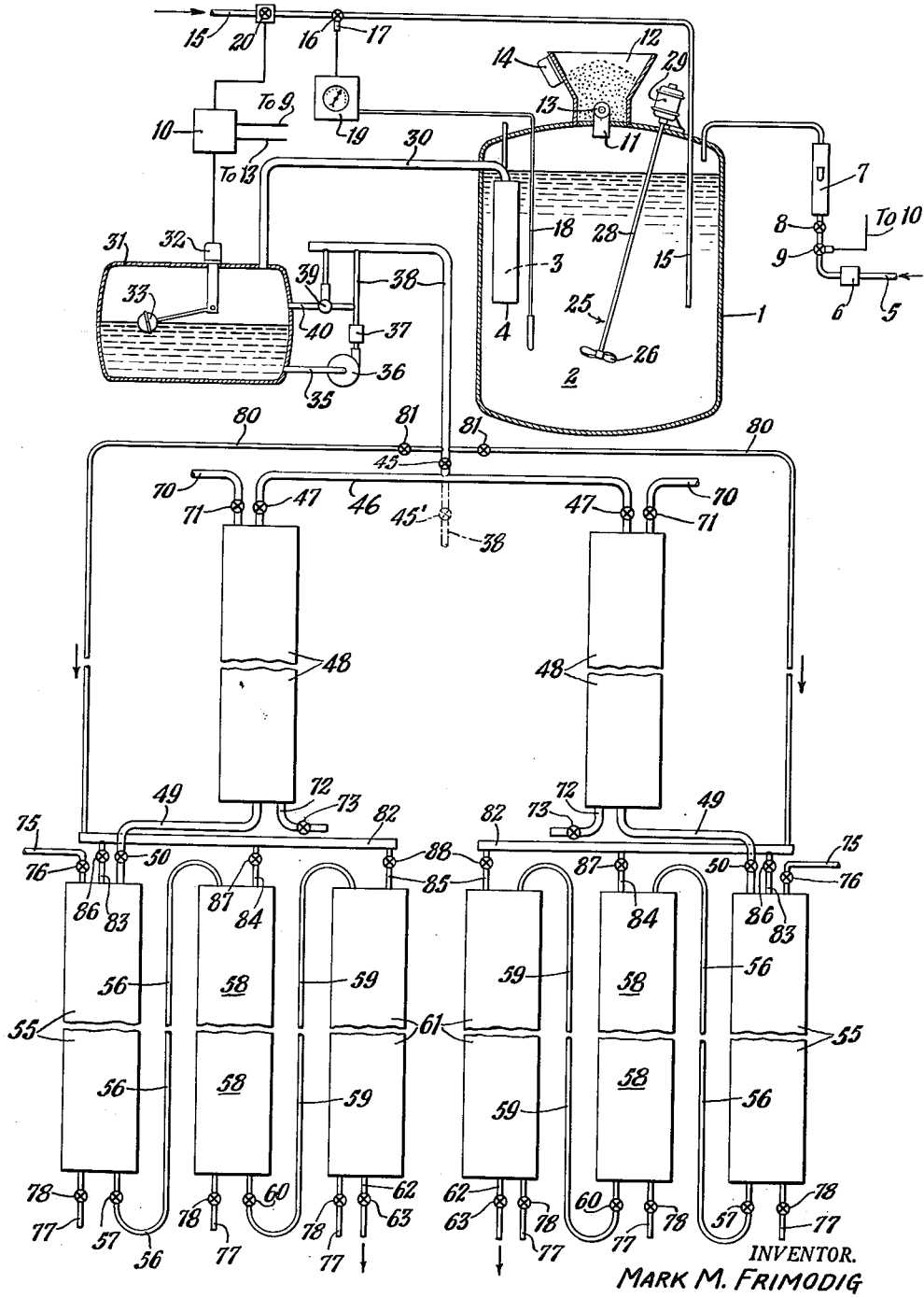
INVENTOR.
MARK M. FRIMODIG
BY
Cleveland B. Hollabaugh
ATTORNEY

3,008,974
METHOD FOR THE SEPARATION OF METALLIC IONS BY THE USE OF AN ION EXCHANGE RESIN

Mark M. Frimodig, St. Louis, Mich., assignor to Michigan Chemical Corporation, St. Louis, Mich., a corporation of Michigan
Filed Oct. 5, 1956, Ser. No. 614,121
8 Claims. (Cl. 260—429.2)

This invention relates to a method and to apparatus for the separation of metallic ions by the use of an ion exachnge resin and, more particularly, to the preparation of an aqueous solution of an eluting agent in a continuous or semi-continuous manner and to its continuous feed in an ion exchange separation process.

Ion exchange separation processes involving the use of a cationic type or an anionic type of ion exchange resin for the separation of mixtures of metallic ions which cannot readily be separated by chemical methods, such as, for example, those of the lanthanum group, the transuranium elements and columbium and tantalum and other mixtures of metallic ions which are difficult to separate by chemical methods, are rapidly increasing in industrial importance and are being carried out on progressively larger scales. Although these processes are inherently intermittent, they require continuous feeds of an aqueous solution of an eluting or complexing agent for relatively long periods of time.

A typical process utilizing ion exchange for the separation of metallic ions is one in which metals of the lanthanum group are separated by the use of a cationic type of ion exchange resin. At least two and frequently more columnar beds of the ion exchange resin are used in such a process. An aqueous solution containing metallic ions of the lanthanum group of elements is fed to a columnar bed of the ion exchange resin which is already loaded with adsorbed ammonium ions. The ions of the lanthanum group displace the ammonium ions from the ion exchange resin in this column, which is usually termed the loading column. The feed of the aqueous solution of the lanthanon ions to the loading column is continued until the resin is loaded to its capacity with adsorbed lanthanon ions.

The loading column containing the adsorbed lanthanon ions is then fed with an aqueous solution of a salt of an eluting agent, such as, for example, an aqueous ammonical solution of ethylene diamine tetra-acetic acid, or n-hydroxyethyl ethylene diamine triacetic acid or of diethylene triamine penta-acetic acid. The eluting agent displaces the ions of the lanthanum group from the ion exchange resin in the loading column, leaving that resin loaded with adsorbed ammonium ions. The effluent from the loading column carrying complex ions comprising a lanthanon metallic ion and the eluting agent is passed continuous to one or more columnar beds of a cationic ion exchange resin, usually referred to as a separation column or columns, which are already loaded with adsorbed metallic ions, sometimes referred to as "retaining ions," which are displaced by the ions of the lanthanum group. The cupric ion is frequently used as the retaining ion. When more than one separation column is used, they are connected in series, and, in any case, the total height of the resin bed used for separation is usually at least three times the height of the resin bed used in the loading column.

The effluent from the separation column or columns during the period in which the lanthanon ions are being eluted from the loading column and adsorbed on the ion exchange resin of the receiving column or columns is an aqueous solution containing a complex anion of the eluting agent and the retaining ion. The feed of the solution of the eluting agent to the loading column and through the separation column is continued until the retaining ions are completely removed from the separation column or columns. This separation can be observed visually when using the cupric ion as the retaining ion on an ion exchange resin in a glass column, since it causes both the resin on which it is adsorbed and the effluent solution to be blue-green in color.

In the separation column the lanthanon ions are progressively adsorbed and eluted from the resin and separate themselves into bands as they progress through the resin. The separation column is then fed with an ammonical aqueous solution of the eluting agent, which is usually different in concentration and in pH from that used to elute the lanthanon ions from the loading column. This feed causes the elution of the lanthanon ions from the resin in the separation column and the effluent from the column is collected in successive fractions corresponding to the bands in the resin.

As will be appreciated from the foregoing, the feed of the aqueous solution of an eluting agent to the columns of ion exchange resin in a process for the separation of metallic ions is an intermittent process and aqueous solutions of two different compositions are ordinarily used. However, the process is a slow one and the period during which a solution of the eluting agent is continuously fed to the columns in either the loading or the separation steps is a relatively long one, usually a matter of days or weeks, or even of months when using large columns. Further, large volumes of the aqueous solution of the eluting agent are required by the process.

Heretofore, the aqueous solutions of the eluting agents have been prepared batch-wise. This has been thought to be necessary, due to the fact that the eluting agents dissolve relatively slowly. Such batch-wise preparation is disadvantageous in that it requires the use of relatively large containers and the storage of large volumes of the solutions.

It is an object of this invention to provide a method by which aqueous solutions of eluting agents are prepared semi-continuously or continuously and continuously fed directly to the ion exchange columns, thereby avoiding the labor and supervision required in the batch-wise preparation of such solution, as well as the necessity to store large volumes of the solutions.

Another object is to provide a method for the semi-continuous preparation of an aqueous solution of an eluting agent and for continuously feeding this solution to a column of ion exchange resin under a uniform pressure.

Another object is to provide a method for the continuous or semi-continuous preparation of two different aqueous solutions of an eluting agent and of continuously feeding the said solutions to a loading column and to a series of separation columns, respectively, and the switching the said continuous feeds of the solutions of eluting agents to a different loading column and to a different series of separation columns, respectively, and thereby continuously preparing the solutions of the eluting agents or preparing them on a semi-continuous basis, without lengthy interruption of the continuous feed of either of the solutions to accommodate the cycle of an ion exchange separation process carried out in a single serial combination of a loading column or columns with a separation column or columns.

Other objects of this invention, and its various advantageous features will become apparent as this description proceeds.

By the method in accordance with this invention, I produce a basic, aqueous solution of an eluting agent having a pH controlled at a uniform, predetermined level in a continuous or a semi-continuous manner and continuously pass this solution to a bed of ion exchange resin in which a process for the separation of metallic ions is being carried out, at essentially the same rate at which the solution is being produced. The rate at which the basic, aqueous solution of the eluting agent is produced is determined by the rate at which it is desired to feed the solution to the bed of ion exchange resin, and that rate is adjusted as closely as practical to the rate at which the ion exchange columns are being fed.

In carrying out this method, I may continuously prepare the aqueous solution of the eluting agent for considerable periods of time, and interrupt such preparation for only short intervals of time. The intermittent preparation of the eluting agent is desirable in ion exchange separation processes in which the elution steps are continued for long periods of time, due to the practical difficulty in precisely adjusting the rate of preparation of the solution of the eluting agent to the rate at which the ion exchange columns are fed to avoid any cumulative excess or deficiency of the aqueous solution of the eluting agent after a long period of time. Further, such intermittent preparation is usually desirable in view of the fact that the rate at which a column of ion exchange resin which the aqueous solution of the eluting agent or conversely that its resistance to the passage of the solution usually varies slowly, but progressively, with the passage of time. However, it is entirely possible by this method to prepare the aqueous solution of the elution agent in an entirely continuous manner, and my apparatus is adapted to operate continuously, as well as discontinuously, as will be fully understood from the detailed description of that apparatus which follows.

To continuously produce this aqueous solution of the elution agent, I continuously feed a stream of water having a uniform, predetermined rate of flow, a stream of an eluting agent having a uniform, predetermined weight per unit of time and a stream of anhydrous ammonia or of ammonium hydroxide or of another water-soluble base into a pool of these materials which is being subjected to vigorous agitation, while automatically controlling the volume of the stream of the aqueous solution of the base in terms of the pH of the agitated pool to maintain that pH at a substantially predetermined level. Under steady conditions of operation, the rate of flow of the gaseous ammonia or of the aqueous solution of the water-soluble base is substantially uniform.

The mixture of materials is continuously passed from the agitated pool in which the eluting agent is more or less completely dissolved into a zone in which it forms a quiescent, non-turbulent pool. The solution is continuously withdrawn from the quiescent pool at a substantially uniform rate of flow and may be fed directly to a bed of ion exchange resin in which a process for the separation of metallic ions is being carried out. Alternatively, the solution is fed to a second quiescent pool, from which it is continuously fed to a bed of ion exchange resin at a rate somewhat different from the rate at which it is fed into this pool and the surface of the pool utilized to stop the feed of materials to the aforesaid turbulent pool when it rises to a predetermined level and to initiate the feed of materials to the turbulent pool when it drops to a predetermined level. The rate at which the solution is withdrawn from the first quiescent pool is one which maintains a substantially uniform liquid level in both that quiescent pool and in the turbulent pool.

In the practice of this method, the volume of the solution of the eluting agent which is fed to the bed or beds of ion exchange resin is the controlling factor in determining the various rates of flow involved. Therefore, the rate of flow from the first quiescent zone is maintained at a constant level by controlling the rates at which the materials which form the solution are fed to the turbulent zone. This can most readily be done initially by adjusting the flow of water into the turbulent zone to a uniform rate which will provide the desired rate of flow of the solution from the first quiescent zone, since water is the major volumetric component of the solution. The rate of feed of the eluting agent is adjusted to a uniform rate which will give the desired concentration in the solution which may, for example, fall within the range of about 0.1 percent, by weight, to about 5.0 percent, by weight, and preferably within the range of about 0.5 percent to about 2.0 percent. The eluting agents which I prefer to use, such as, for example, ethylene diamine tetra-acetic acid, n-hydroxyethyl ethylene diamine triacetic acid and diethylene triamine penta-acetic acid are powdered solids. I may feed such solid eluting agent to the turbulent pool by the use of a metering feed device, such as, for example, one which combines a vibrator and a screw conveyor. As already noted, the rate of flow of gaseous ammonia or of the aqueous solution of a base to the agitated pool is automatically controlled in terms of the pH of that pool at the pH level desired. This pH level may, for example, fall within the range of a pH of about 7.0 to a pH of about 10.0.

The volumetric rate of flow of water to the turbulent zone and, hence, the rate of flow of the solution of the eluting agent from the first to the second quiescent zone may be exactly equal to the rate at which an ion exchange column is fed from the second quiescent zone. However, I have found that it is preferable in routine operation to maintain a rate of flow of the solution of the eluting agent from the first to the second quiescent zone which will cause a variation of the surface level of the solution in the second quiescent zone which will cause the materials for the solution to be fed to the turbulent zone about 75 percent to about 99 percent of the total time during which the solution is continuously fed to an ion exchange column.

In carrying out the method of this invention, I may continuously produce an aqueous solution of an eluting agent having a given concentration and pH for a substantial period, and then by an adjustment of the rate of feed of the eluting agent to the turbulent pool or by the adjustment of the automatic pH control to change the feed of the ammonia gas or of the aqueous solution of the water-soluble base, as the case may be, change the pH of the solution to a different value or both and thereby continuously produce a different solution of the eluting agent.

Thus, a solution of the eluting agent, such as, for example, an ammonical solution of ethylene diamine tetra-acetic acid having a concentration of about one-half percent and a pH of about 8.0 can be continuously produced and continuously fed to a loading column of ion exchange resin which carries adsorbed metallic ions to be separated, such as, for example, ions of the lanthanum group, until the ions are eluted from the resin of that column and re-adsorbed by the ion exchange resin in a separation column or series of separation columns and until the retaining ions, such as, for example, the cupric ions are entirely eluted from the separation column. The rate of feed of the ethylene diamine tetra-acetic acid can then be increased to produce a solution having a concentration of about one percent and the automatic pH control adjusted to feed aqueous ammonium hydroxide at a rate which maintains the pH of the solution at a value of, for example, about 8.5, while switching the flow of the solution from the loading column to the separation column, or the first of a series of separation columns.

In other alternative embodiment of this invention, I may simultaneously and continuously produce two different solutions of an eluting agent which differ in concentration and pH, one of which is adapted to elute adsorbed ions from a series of loading columns, while the other is adapted to be fed to a series of separation columns. The flow of the solution for the loading columns can be periodically switched from one loading column to another, while the flow of the solution for the separation columns may be periodically switched from one separation column or series of separation columns to another separation column or series of separation columns. Such a simultaneous preparation of two different solutions of the eluting agent is convenient for use with installations which include a plurality of loading columns and a plurality of separation columns or series of separation columns, since it avoids the necessity for periodically changing the rate of feed of the eluting agent or the pH control or both in this method.

The apparatus used in the method in accordance with this invention comprises a liquid container adapted for the continuous preparation of an aqueous solution of an eluting agent which is divided into two zones by a partition which leaves the two zones connected together at a location at or near the bottom of the container. One of these zones is provided with a mixer or agitator and will be termed the "turbulent zone," while the other zone is adapted to keep a solution therein in a quiescent, non-turbulent state, and will be termed the "first quiescent zone."

The turbulent zone is supplied with a water feed by a means, such as, for example, a valved conduit, which is adapted to furnish a continuous stream of water to the turbulent zone at a predetermined, uniform rate of flow. The apparatus is provided with a means adapted to supply an eluting agent to the turbulent zone at a predetermined, uniform rate, and with a means for supplying gaseous ammonia or an aqueous solution of a water-soluble base at a volumetric rate which is controlled by the pH of a mixture in the turbulent zone to maintain the pH of the mixture at a predetermined, uniform value.

The upper portion of the first quiescent zone of the liquid container is connected by a conduit to the top or upper portion of a second liquid container which provides a second non-turbulent zone which will be termed the "second quiescent zone." The bottom or lower portion of this second liquid container is connected by a conduit to the top or upper portion of at least one columnar container carrying an ion exchange resin. The lower part or bottom of this column containing an ion exchange resin is connected to the top or upper portion of a second column or ion exchange resin.

In the preferred form of my apparatus, I provide mechanism which automatically interrupts the feed of each of the raw materials to the turbulent zone in the first liquid container, which the liquid level of the solution rises to a predetermined level in the second quiescent zone in the second liquid container and at the same time stops an agitator operating in the turbulent zone and, conversely, automatically starts the feed of each of these materials to the turbulent zone when the surface level falls below a predetermined point. Also, I provide a means which, in the event the feed of one of the three essential materials of the solution of the eluting agent be inadvertently stopped or deviate from the desired rate, will interrupt the feed of all of the materials.

The apparatus used in the method in accordance with this invention essentially includes at least two columns of ion exchange resin connected in series and preferably includes four such columns connected in series, i.e. with the bottom or lower part of the first column connected to the top or upper portion of the second coulmn and so on. The first of these columns is a loading column, while the second column and addition columns in the series are separation columns. The second quiescent zone of the second container for the solution of the eluting agent is preferably connected at a location at or near its bottom through a valved conduit to the top or upper part of both the loading column and of each separation column.

This apparatus may include two or more series of columns of ion exchange resin, each of which includes a loading column followed by one and preferably three or more separation columns. When such a plurality of columns is included in the apparatus the conduit from the quiescent zone of the second container is connected through a valved header to the top or upper portion of each loading column and to the top or upper portion of the first separation column of each series of separation columns.

In apparatus which includes two or more series of columns of ion exchange resin, each of which includes a loading column followed by three or more separation columns, I prefer to include two duplication combinations of the first and second liquid containers and their associated equipment and conduits. In this embodiment of my apparatus, the bottom or lower part of the second container of one of these combinations is connected by a valved conduit to a header which is, in turn, connected by a series of valved conduits to the top or upper portions of each of the loading columns. Similarly, the bottom or lower part of the second container of the other or second of these combinations is connected by a valved conduit to a header which is, in turn, connected by a valved conduit to the top or upper portions of each of the separation columns in each of the series.

Having indicated the general nature of the method and the apparatus in accordance with this invention, I will now proceed with a description of specific embodiments of the apparatus and of the method as carried out utilizing this apparatus, with reference to the accompanying drawing. In the drawing in which like reference characters are used to refer to like parts, the ion exchange resin columns and their connecting conduits are shown schematically, while the container in which the solution of the eluting agent is prepared and that which provides the second quiescent zone are shown in vertical cross-section.

Referring specifically to the single figure of the drawing, the numeral 1 designates a container the interior of which is divided into two zones 2 and 3 by a partition 4 which may, as shown, be in the form of a sleeve and which extends from above the normal liquid level in the container downwardly to a point near the bottom of the container, leaving a passageway between the two zones.

The conduit 5 is connected to a source of water which is preferably free of metallic ions, and is adapted to deliver the water to zone 2 of container 1. Conduit 5 is provided with a pressure controller 6, and a rotameter 7 adapted to measure the rate of flow of water through the conduits. This conduit is also provided with a valve 8 which is suitable for manual adjustment to regulate the rate of flow of water through the conduit and a second valve 9 which is provided with an electrical, hydraulic or pneumatic controller which is adapted to fully close or fully open the valve. The valve 9 is connected to and controlled by the master controller 10. The choice between an electrical, a hydraulic and a pneumatic control for the valve 9 is determined by the type of master controller 10 used with the apparatus. Thus, I use an electrically controlled valve 9, such as one operated by a solenoid, with a master controller which exercises its control by the use of electricity.

The feeder 11 for the delivery of an eluting agent to zone 2 comprises a feed bin 12 which is kept supplied with the eluting agent from a suitable source, a screw conveyor 13 provided with a variable speed drive powered by an electric motor by which the rate of feed of the eluting agent to zone 2 can be adjusted and a vibrator 14 which assures a uniform supply of the eluting agent from the feed bin 12 to the screw conveyor 13. The electric motor which drives the screw conveyor 13 is connected to the master controller 10 and is adapted to be stopped and started by the master controller as will be more fully explained hereinafter.

The conduit 15 is provided with an electrically, pneumatically or hydraulically controlled valve 16, and is connected to a suitable source of gaseous ammonia or of an aqueous solution of a water-soluble base, such as, for example, an aqueous solution of ammonia and is adapted to supply a controlled volume of the ammonia gas or the aqueous solution of the water-soluble base to the zone 2 of container 1. The conduit 15 is also provided with pressure controller 17 which maintains a constant gas pressure, when gaseous ammonia is used or a constant liquid pressure when an aqueous solution of a base is used at the inlet of the valve 16. The pH probe 18 extends into zone 2 of container 1 and is electrically connected to the pH controller 19 which is adjustable as to the pH which it maintains. The pH controller 19 is electrically, pneumatically or hydraulically connected to the control of the valve 16 and adjusts the setting of the valve 16 as required by the pH measured by the pH probe 18. The conduit 15 is provided with a second valve 20 which is connected to the master controlled thereby to be fully open or entirely closed.

The zone 2 of the container 1 is provided with an agitator 25. The agitator 25 may, as shown by the drawing, consist of a propeller 26 carried by a shaft 28 which is driven by an electric motor 29. The propeller 26 is located within the zone 2 and is adapted to mix the ingredients fed into that zone by the conduits 5 and 15 and the feeder 11.

The zone 3 of container 1 which is formed by the partition 4 is the "first quiescent zone" mentioned hereinbefore. In the operation of this apparatus the solution produced in zone 2, referred to hereinbefore as the "turbulene zone" passes upwardly through zone 3 in quiet non-turbulent flow which permits any undissolved particles of the eluting agent to settle out of this zone and into the turbulence of zone 2 where they have an opportunity to dissolve with under the conditions of pH determined by the controller 19.

The conduit 30 connects the upper part of zone 3 to the top of the tank 31 which is provided with a float type level controller 32, carrying a float 33. The controller 32 is connected by suitable electrical, pneumatic or hydraulic connections to the master controller 10. As already noted, the master controller 10 is connected by suitable electrical, pneumatic or hydraulic connections to the valves 9 and 20, the motor 29 and the variable speed drive motor of the screw conveyor 13. The level controller is adapted to respond to a predetermined upper position of its float 33 to activate the controller 10 to cause it to close valves 9 and 20 and to stop motor 29 and the motor which drives the screw conveyor 13 when in its upper preset position. The level controller is also adapted to respond to a predetermined lower position of its float 33 to activate controller, start the motor 29 and the motor which operates the screw conveyor 13, and to open valves 9 and 20.

The conduit 35 connects the lower part of the tank 31 to the pump 36 adapted to pass the solution of eluting agent through filter 37 to conduit 38. The conduit 38 is provided with a constant head pressure controller assembly 39 which maintains a uniform pressure head on the solution of the eluting agent passing through the filter 37 and usually by-passes a fraction of the solution of the eluting agent back to tank 31 through conduit 40.

The conduit 38 connects the outlet side of the filter 37 through the valve 45 to the header conduit 46, which is connected through valves 47, 47 to the loading columns 48, 48. The conduits 49, 49 provided with valves 50, 50 connect the lower part of the loading columns 48, 48 with the top of the separation columns 55, 55. The lower part of the separation columns 55, 55 are connected by the conduits 56, 56 provided with valves 57, 57 to the upper part of separation columns 58, 58. The lower part of separation columns 58, 58 are, in turn, connected by the conduits 59, 59 carrying valves 60, 60 to the upper part of the separation columns 61, 61. The bottoms of the last separation columns 61, 61 are provided with discharge conduits 62, 62 provided with valves 63, 63. A conduit 70 provided with a valve 71 is connected to the top of each of the loading columns 48, 48 and the bottom of each is provided with a conduit 72 carrying a valve 73. These conduits 70, 70 are for the purpose of feeding water to the column to wash the resin, a conditioning solution, such as, for example, a solution of ammonium chloride to the column for loading the ion exchange resin contained therein with ammonium ions and for the purpose of feeding an aqueous solution containing a mixture of metallic ions to be separated for loading the column. The conduits 72, 72 are for the purpose of supplying water to the column to back-wash the resin therein, and to drain the water used for this purpose or draining aqueous solutions from the resin in the column, or for washing the resin.

The conduits 75, 75 carrying valves 76, 76 are connected to the top of the separation columns 55, 55 and are for the purpose of feeding an aqueous solution carrying a retaining ion to those columns and on to columns 58, 58 and 61, 61. As in the case of the loading columns, each of the separation columns is provided with a conduit 77 carrying a valve 78 for the purpose of supplying water to the column for the purpose of back-washing the ion exchange resin contained therein and draining the wash water therefrom.

In one of the alternative embodiments of my apparatus, the conduit 38 may also be connected to conduits 80, 80 through valves 81, 81 to the headers 82, 82. The headers 82, 82 are, respectively, connected through conduits 83, 84 and 85 carrying valves 86, 87 and 88 to the top of the separation columns 55, 58 and 61. This combination of conduits permits any one of the separation columns 55, 55, 58, 58, and 61, 61 to be fed an aqueous solution of eluting agent directly from the tank 31.

In utilizing the apparatus illustrated by the drawing in the separation of a mixture of metallic ions, the resin in the columns 48, 48, 55, 55, 58, 58 and 61, 61 is prepared by back-washing with water. The resin in the loading columns 48, 48 is loaded with ammonium ions, for example, by treatment with an aqueous solution of ammonium hydroxide, while the resin in the separation columns 55, 55, 58, 58 and 61, 61 is loaded with displacement ions, for example, the cupric ion by treatment with an aqueous solution of cupric sulfate. The loading columns 48, 48 are then loaded with a mixture of metallic ions to be separated, following well established procedures which are not a part of this invention.

In carrying out the method in accordance with this invention, the pH controller 19 is adjusted to control the pH of a mixture in zone 2 at, for example, a pH of 8.0. Water is fed through conduit 5 and gaseous ammonia or an aqueous solution of a water-soluble base is fed through conduit 15 to zone 2 of container 1. At the same time an eluting agent, for example, ethylene diamine tetraacetic acid, is fed by the feeder 11 to zone 2. The rate at which these materials are fed to zone 2 is adjusted with respect to each other to produce, for example, a solution containing one-half percent, by weight, of the eluting agent. The rate at which these materials are fed to zone 2 may be adjusted to produce the exact overall volume of solution required to feed the loading columns 48, 48 at the desired rate. However, I prefer to adjust the rate of feed of the materials to produce from about 1%, by volume, to about 10%, by volume, more of the solution than is fed to the columns 48, 48, and thereby avoid the difficulty involved in precisely adjusting the rate at which the solution is prepared. At the same time, the electric motor 29 is started to agitate the mixture in zone 2 by the action of the propeller 26. As the mixture rises in zone 2, it also rises in zone 3 in which it is in a quiescent state as compared with its turbulent state in zone 2. Any undissolved eluting agent entering this quiescent zone 3 tends to settle to the bottom of the container 1.

The eluting agent, and the base fed to zone 2 form solution in the water being fed to that zone under the vigorous agitation of the propeller 26, which is homogeneous by the time it reaches the top of the quiescent zone 4. From the top of the zone 4 the solution flows through conduit 30 into tank 31. This solution is pumped from tank 31, by the action of pump 36 through filter 37 and conduit 38, with the valve 45 open and the valves 81, 81 closed, into the header conduit 46. The solution flows from the header conduit 46 through valves 47, 47 in the open position into the loading columns 48, 48.

When the rate at which the solution of the eluting agent is prepared exceeds the rate at which it is fed to the loading columns 48, 48, the level of the solution in the tank 31 slowly rises until the float 33 of the level controller 32 rises to a position which causes the level controller to activate the master controller 10 to close valves 9 and 20 and to stop motor 29 and the motor which operates the screw conveyor 13, and thereby interrupt the preparation of the solution in zone 2. As the feed of the solution of the eluting agent from tank 31 is continued, the surface level of the solution in tank 31 drops. When the float 33 falls to a predetermined location, the level controller 32 again activates the master controller 10 and causes it to open valves 9 and 20 and to start the motor of screw conveyor 13 and motor 29 and thereby cause the preparation of the solution of eluting agent to be resumed.

The solution of eluting agent is continuously fed to the loading columns 48, 48 and the effluent from those columns passed through conduits 49, 49, with the valves 50, 50 in open position to the separation columns 55, 55 through conduits 56, 56, with valves 57, 57 open to separation columns 58, 58 and through conduits 59, 59 with valves 60, 60 open into separation columns 61, 61, until the adsorbed ions carried by the ion exchange resin in the loading columns 48, 48 are eluted therefrom and re-adsorbed by the ion exchange resin in the separation columns 55, 55. During this operation an aqueous solution containing the displacement ion, the eluting agent and the water-soluble base, for example, a solution containing ammonium cations, and a complex anion formed by the complexing of the cupric ion by ethylene diamine tetra-acetic acid, flows out of the separation columns 61, 61 through conduits 77, 77 and the open valves 78, 78.

The solution of eluting agent is then fed through conduits 80, 80 to headers 82, 82 by opening valves 81, 81 and closing valves 45 and 50, 50. At the same time, the composition of the solution of eluting agent may be and, preferably, is altered by adjusting the rate of feed of the eluting agent by the screw conveyor 13 and the level at which the pH controller 19 maintains the pH of the solution. The rate at which the solution is prepared may also be altered by a change in the rate at which water is fed by a manual adjustment of valve 8.

For example, the rate at which water is fed to zone 2 may be reduced by approximately one-half and the pH controller 19 is re-adjusted to control the pH of the solution at a value of 8.5. This reduces the rate of flow of the solution through conduit 30 to one-half its original rate, raises the concentration of the eluting agent in the solution to one per cent, as well as adjusts its pH to a value of 8.5.

The solution of eluting agent is fed from the headers 80, 80 directly into the separation columns 55, 55 and, in turn, through separation columns 58, 58 and 61, 61 by opening valves 86, 86 while leaving valves 87, 87 and 88, 88 closed. The metallic ions adsorbed in the resin in the separation columns separate themselves into successive bands. The solutions formed by the successive elution of each band are collected as separate fractions as the flow of the eluting agent from the container is continued. This flow is continued at a steady rate until the metallic ions being separated are removed from the separation columns 61, 61.

The direct feed of the solution of eluting agent to columns 55, 55 may be continued until the metallic ions of the original mixture from the loading columns 48, 48 have been entirely eluted from the separation columns 61, 61. However, I prefer to bypass columns 55, 55 as soon as the ion exchange resin therein is free of the metallic ions being separated by closing valves 86, 86 and valves 57, 57, while opening valves 87, 87. Similarly, as soon as the ion exchange resin in columns 58, 58 are free of the metallic ions, these columns are, in turn, by-passed by closing valves 87, 87 and valves 60, 60, while opening valves 88, 88.

As soon as passage of the solution of eluting agent to the loading columns 48, 48 is by-passed to the separation columns 55, 55 as described hereinbefore, the ion exchange resin in the loading columns is free for its next treatment in the cycle of operation which may, for example, be washing with water or a re-loading with metallic ions to be separated or both. Similarly, the ion exchange resin in the separation columns 55, 55 and 58, 58 is free for the next stage of the operation, as soon as the flow of the solution of the eluting agent through them is by-passed. This by-passing of the solution of the eluting agent and the freeing of the ion exchange resin in the by-passed columns for further treatment makes possible the continuous withdrawal of the solution from the tank 31. Thus, the loading columns 48, 48 can be re-loaded with a charge of metallic ions to be separated while the separation columns 55, 55, 58, 58 and 61, 61 are being eluted, and as soon as their elution is complete, the flow of the solution of eluting agent returned to the loading columns 48, 48, with any indicated changes in its composition or rate of production or both. In this manner, I am able to make maximum use of the equipment.

In an alternative embodiment of my apparatus, I provide two sets of equipment for the production of aqueous solutions of eluting agent. These sets of equipment are duplicates in every respect, and each of them includes each of the parts designated on the drawing by reference numerals 1–38, inclusive. The provision of duplicating equipment for the preparation of a solution of an eluting agent permits me to simultaneously prepare two different solutions of eluting agent, for example, one which is adapted for the elution of a loading column and another one which is adapted for the elution of the separation columns. Such duplication of the equipment avoids the necessity of periodically altering the composition of the solution being prepared in a single set of equipment as described hereinbefore, and is particularly desirable in an installation in which a relatively large number of loading columns and of separation columns is included in my apparatus or when a plurality of large columns of both types is included.

In this alternative embodiment of my apparatus, the conduit 38 of the second set of equipment including the parts designated by the numerals 1–38, inclusive, may be connected to header 46 and conduits 80, 80 with a duplication of the valves 45 and 81, 81, in the same manner as illustrated by the drawing for a first set of the equipment. Such connection provides complete flexibility in the operation of the apparatus, since either set of equipment may be used for the preparation of a solution for the loading columns or for the separation columns and either set of equipment taken out of service and the other used as described hereinbefore. Alternatively, the conduit 38 of the second set of equipment may be connected, for example, to the header 46 as shown in dotted outline by the drawing and used solely to prepare a solution of eluting agent to feed to the loading columns 48, 48, while the first set of equipment is used solely to prepare a solution of eluting agent to feed to the separation columns 55, 55, 58, 58, and 61, 61.

In carrying out the method of this invention using this alternative form of apparatus, including two sets of equipment for the preparation of an aqueous solution of an eluting agent, aqueous solutions of different compositions are prepared simultaneously. One of these solutions may, for example, be adapted for the elution of loading columns and the other adapted for the elution of separation columns.

The solution adapted for the elution of the loading column may, for example, be fed to one of the loading columns 48, 48, while the valve 47 of the other loading column is closed and that column is being loaded with a mixture of adsorbed ions to be separated, and, at the completion of the elution of the first loading column, switched to the now loaded second loading column 48, by opening the closed valve 47 and closing the open valve 47. By such alternation of the stages of the cycle of the loading columns 48, 48, the solution of the eluting agent may be prepared on a substantially continuous basis.

Similarly, the solution adapted for the elution of the separation columns may be fed to one series of the separation columns 55, 58, 61, which contains a mixture of metallic ions being separated, while the other series of separation columns 55, 58 and 61 are being loaded with retaining ions and then with metallic ions to be separated. When these phases of the cycle are completed, the flow of the solution of eluting agent is switched to the freshly loaded separation columns 55, 58 and 61.

As will be appreciated from the foregoing, the preparation of the solution of the eluting agent is carried out on a substantially continuous basis by either alternative embodiment of this invention, despite the fact that the elution of the columns of ion exchange resins is inherently an intermittent operation. In any case, it will be noted that each step of elution is a relatively long process requiring many hours. When using a single set of equipment for preparing the solution of the eluting agent, the periodic adjustment of the composition of the solution of the eluting agent is made only at relatively long intervals. When using duplicating sets of equipment for preparing the solution, the necessity for such periodic readjustment of the composition of the solution is entirely eliminated.

As can be fully appreciated from the foregoing, the method and apparatus in accordance with this invention entirely eliminates the batch-wise preparation of the solution of the eluting agent required for the ion exchange separation of metallic ions and the necessity for storing large volumes of such solutions, and can be used substantially continuously for long periods of time with minimal supervision. Furthermore, the aqueous solution of the eluting agent which is supplied to the ion exchange resin columns is uniform both as to composition and as to volume.

The foregoing details of the method in accordance with this invention and the apparatus in which it is carried out are given for the purpose of fully illustrating the invention and will be obvious to those skilled in the use of ion exchange resins for the separation of metallic ions that many modifications can be made in the details of both the method and apparatus illustrated. Thus, the specific embodiments of the apparatus and the method by which they are used and adapted for the preparation of a solution of a solid eluting agent. It will be obvious that the apparatus and the method by which it is used can be modified to prepare the solution to be fed to the ion exchange columns from a concentrated solution of the eluting agent by the substitution of a conduit and associated parts fed by a concentrated solution of the eluting agent duplicating the water conduit 5 and its associated parts for the vibratory feed 11.

Further, it will be understood that the selection of apparatus including two loading columns and six separation columns has been solely for the purposes of illustration and that the apparatus may include any desired number of each of these types of columns. Again, it will be obvious that when it is desired to continuously prepare the solution of the eluting agent at the exact rate at which it is fed to the columns of ion exchange resin, that the tank 31, its associated float control 32, the master control 10 and the valves 9 and 29 can be omitted from the apparatus. It will also be understood that the method and apparatus in accordance with this invention can be advantageously employed in any ion exchange separation of metallic ions, including both those utilizing the cationic type of exchange resin and those employing the anionic type of ion exchange resin.

I claim:

1. A method for the separation of a mixture of metallic ions by the use of an ion exchange resin which includes the steps of loading a columnar bed of ion exchange resin with a mixture of metallic ions to be separated, admixing in a turbulent pool a stream of water having a uniform, predetermined rate of flow, a stream of a powdered solid, amino-acetic acid eluting agent having a uniform, predetermined rate of flow and a stream of a base selected from the group consisting of gaseous ammonia and aqueous ammonium hydroxide having a rate of flow controlled to produce an aqueous solution of the eluting agent having a predetermined pH value, passing the mixture through a quiescent pool thereby permitting any undissolved eluting agent to settle out of the solution and continuously flowing the resulting solution from the said quiescent pool into the loaded columnar bed of ion exchange resin to cause the elution of the adsorbed metallic ions from the said resin bed and flowing the effluent from the said resin bed into a second columnar resin bed carrying adsorbed metallic ions which are displaceable by the metallic ions being separated.

2. A method for the separation of a mixture of metallic ions by the use of an ion exchange resin which includes the steps of loading a columnar bed of ion exchange resin with a mixture of metallic ions to be separated, continuously admixing in a turbulent pool a continuous stream of water having a uniform, predetermined rate of flow, a continuous stream of a powdered solid, amino-acetic acid eluting agent having a uniform, predetermined rate of flow and a continuous stream of a base selected from the group consisting of gaseous ammonia and aqueous ammonium hydroxide having a rate of flow controlled to produce an aqueous solution of the eluting agent having a predetermined pH value, passing the mixture through a quiescent pool thereby permitting any undissolved eluting agent to settle out of the solution and continuously flowing the resulting solution from the said quiescent pool into a surge pool from which the solution of the eluting agent is continuously passed at a slightly slower rate than it flows into the pool, into the loaded columnar bed of ion exchange resin to cause the elution of the adsorbed metallic ions from the said resin bed, flowing the effluent from the said resin bed into a second columnar resin bed carrying adsorbed metallic ions which are displaceable by the metallic ions being separated, continuing the said continuous preparation of the solution of the eluting agent until the level of the solution in the said surge pool rises to a predetermined level, stopping the flow of the said materials into the said turbulent pool until the level of the solution in the said surge pool drops to a predetermined level and resuming the flow of the said materials to the said turbulent pool.

3. A method for the separation of a mixture of metallic ions by the use of an ion exchange resin which includes the steps of loading a columnar bed of ion exchange resin with a mixture of metallic ions to be separated, admixing in a turbulent pool a stream of water having a uniform, predetermined rate of flow, a stream of a powdered ethylene diamine tetra-acetic acid having a uniform, predetermined rate of flow and a stream of gaseous ammonia having a rate of flow controlled to produce an aqueous solution having a predetermined pH value, passing the mixture through a quiescent pool thereby permitting any undissolved particles of the ethylene diamine tetra-acetic acid to settle out of the solution and continuously flowing the resulting solution from the said quiescent pool into the loaded columnar bed of ion exchange resin to cause the elution of the adsorbed metallic ions from the said resin bed and flowing the effluent from the said resin bed into a second columnar resin bed carrying adsorbed metallic ions which are displaceable by the metallic ions being separated.

4. A method for the separation of a mixture of metallic ions of the lanthanum group of elements by the use of an ion exchange resin which includes the steps of loading a columnar bed of ion exchange resin with a mixture of the lanthanon ions to be separated, admixing in a turbulent pool a stream of water having a uniform, predetermined rate of flow, a stream of ethylene diamine tetra-acetic acid having a uniform, predetermined rate of flow and a stream of gaseous ammonia having a rate of flow controlled to produce an aqueous solution having a predetermined pH value, passing the mixture through a quiescent pool thereby permitting any undissolved particles of the ethylene diamine tetra-acetic acid to settle out of the solution and continuously flowing the resulting solution from the said quiescent pool into the loaded columnar bed of ion exchange resin to cause the elution of the adsorbed lanthanon ions from the said resin bed and flowing the effluent from the said resin bed into a second columnar resin bed carrying adsorbed cupric ions.

5. A method for the separation of a mixture of metallic ions by the use of an ion exchange resin which includes the steps of loading a columnar bed of ion exchange resin with a mixture of metallic ions to be separated, admixing in a turbulent pool a continuous stream of water having a uniform, predetermined rate of flow, a stream of a powdered, solid amino-acetic acid eluting agent having a uniform, predetermined rate of flow and a stream of gaseous ammonia having a rate of flow controlled to produce an aqueous solution of the eluting agent having a predetermined pH value, passing the mixture through a quiescent pool thereby permitting any undissolved particles of the eluting agent to settle out of the solution and continuously flowing the resulting solution from the said quiescent pool into the loaded columnar bed of ion exchange resin to cause the elution of the adsorbed metallic ions from the said resin bed and flowing the effluent from the said resin bed into a second columnar resin bed carrying adsorbed metallic ions which are displaceable by the metallic ions being separated, continuing the said flow until the displaceable metallic ions are substantially completely removed from the second bed of ion exchange resin, changing the rate at which water is fed to the said turbulent pool and the rate of flow of the gaseous ammonia to produce a solution having a concentration of the said eluting agent and a pH value different from those of the original solution and diverting the flow of the said solution directly to the second bed of ion exchange and continuing the said flow until the metallic ions adsorbed by the said bed of resin have been substantially completely eluted therefrom.

6. A method for the separation of a mixture of metallic ions of the lanthanum group of elements by the use of an ion exchange resin which includes the steps of loading a columnar bed of ion exchange resin with a mixture of the lanthanon ions to be separated, continuously admixing in a turbulent pool a continuous stream of water having a uniform, predetermined rate of flow, a continuous stream of ethylene diamine tetra-acetic acid having a uniform, predetermined rate of flow and a continuous stream of gaseous ammonia having a rate of flow controlled to produce an aqueous solution having a predetermined pH value, passing the mixture through a quiescent pool thereby permitting any undissolved particles of the ethylene diamine tetra-acetic acid to settle out of the solution and continuously flowing the resulting solution from the said quiescent pool into the loaded columnar bed of ion exchange resin to cause the elution of the adsorbed lanthanon ions from the said resin bed and flowing the effluent from the said resin bed into a second columnar resin bed carrying adsorbed cupric ions, continuing the said flow until the cupric ions are substantially completely removed from the second bed of ion exchange resin changing the rate at which water is fed to the said turbulent pool and the rate of flow of the said gaseous ammonia to produce a solution having a concentration and a pH value different from those of the original solution and diverting the flow of the said ammonical solution of the ethylene diamine tetra-acetic acid directly to the second bed of ion exchange resin and continuing the said flow until the lanthanon ions adsorbed by the said second bed of ion exchange resin have been substantially completely eluted therefrom.

7. In a process for the separation of a mixture of metallic ions by the use of an ion exchange resin, the steps of continuously and simultaneously feeding a powdered solid, amino-acetic acid eluting agent in a uniform stream which delivers a predetermined weight per unit of time, a stream of water having a uniform, predetermined rate of flow and a stream of gaseous ammonia into an agitated pool of a mixture of these materials, while automatically controlling the volume of the gaseous ammonia fed to the pool in terms of the pH of the agitated pool to maintain its pH substantially at a uniform, predetermined level, continuously passing the mixture of the said ingredients into a zone in which the liquid forms a quiescent pool, continuously flowing the resulting solution from the said quiescent pool at a substantially uniform rate of flow, which maintains a substantially uniform liquid level in the said quiescent pool and in the said agitated pool, to a bed of ion exchange resin carrying a mixture of adsorbed ions to be separated.

8. In a process for the separation of a mixture of metallic ions by the use of an ion exchange resin, the steps of simultaneously and continuously feeding powdered ethylene diamine tetra-acetic acid in a uniform stream which delivers a predetermined weight per unit of time, a stream of water having a predetermined uniform rate of flow and a stream of gaseous ammonia into an agitated pool of a mixture of these materials, while automatically controlling the volume of the gaseous ammonia fed to the agitated pool in terms of the pH of the pool to maintain its pH substantially at a uniform, predetermined level, continuously passing the mixture of the said ingredients into a zone in which the liquid forms a quiescent pool, continuously flowing the resulting ammonical solution of ethylene diamine tetra-acetic acid from the said quiescent pool at a substantially uniform rate of flow which maintains a substantially uniform liquid level in the said quiescent pool and in the said agitated pool, to a bed of ion exchange resin carrying a mixture of adsorbed ions to be separated.

References Cited in the file of this patent

UNITED STATES PATENTS

| | | |
|---|---|---|
| 1,942,808 | Dotterweich | Jan. 9, 1934 |
| 2,422,821 | Bhoota | June 24, 1947 |
| 2,539,282 | Spedding et al. | Jan. 23, 1951 |
| 2,636,044 | Huffman et al. | Apr. 21, 1953 |
| 2,697,724 | Collier | Dec. 21, 1954 |

OTHER REFERENCES

Moeller et al.: "J.A.C.S.," 77, 3182–85, September 20, 1955.

Spedding et al.: "J.A.C.S.," 76, 2557–60, May 5, 1954.

Wheelwright et al.: "J.A.C.S.," 75, 2529–32, 4196–4201, May 20, 1953.

Vickery: "Chem. Soc. J. (Lond.)," 4357, 1952.

Marsh: "Chem. Soc. J. (Lond.)," 3057, 1951.

Marsh: "Chem. Soc. J. (Lond.)," 1819, 1950.